United States Patent
Ishizaki et al.

(10) Patent No.: US 10,386,981 B2
(45) Date of Patent: *Aug. 20, 2019

(54) DISPLAY DEVICE WITH TOUCH DETECTION FUNCTION, AND ELECTRONIC UNIT

(71) Applicant: Japan Display Inc., Tokyo (JP)

(72) Inventors: Koji Ishizaki, Tokyo (JP); Koji Noguchi, Kanagawa (JP); Osamu Ishige, Aichi (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,475

(22) Filed: Oct. 30, 2018

(65) Prior Publication Data

US 2019/0064971 A1     Feb. 28, 2019

Related U.S. Application Data

(63) Continuation of application No. 15/223,377, filed on Jul. 29, 2016, now Pat. No. 10,156,948, which is a
(Continued)

(30) Foreign Application Priority Data

Sep. 14, 2010   (JP) .................................. 2010-205573

(51) Int. Cl.
*G06F 3/041*     (2006.01)
*G06F 3/044*     (2006.01)
(Continued)

(52) U.S. Cl.
CPC ............ *G06F 3/044* (2013.01); *G06F 3/0412* (2013.01)

(58) Field of Classification Search
CPC .. G06F 3/041; B32B 7/00; G09G 5/00; H01L 23/60; H01L 29/408; H01L 2224/8011; H01L 2224/8111
(Continued)

(56) References Cited

U.S. PATENT DOCUMENTS 4,281,323 A    7/1981 Burnett et al.
5,488,204 A    1/1996 Mead et al.
(Continued)

FOREIGN PATENT DOCUMENTS

CN    1520544 A    8/2004
CN    101120304 A    2/2008
(Continued)

OTHER PUBLICATIONS

Chinese Office Examination Report issued in connection with related Chinese Patent Application No. CN 201110264222.0 dated Jan. 26, 2015 with English translation.
(Continued)

*Primary Examiner* — Temesghen Ghebretinsae
*Assistant Examiner* — Paras D Karki
(74) *Attorney, Agent, or Firm* — Dentons US LLP

(57) ABSTRACT

A display device with a touch detection function including: a plurality of elements performing display operation; a plurality of touch detection electrodes arranged side by side to extend in one direction, and each outputting a detection signal based on a change in an electrostatic capacitance caused by an external proximity object; a conductive film insulated from or connected with high resistance to the touch detection electrodes, and disposed to cover the touch detection electrodes; and a touch detection circuit detecting the external proximity object by sampling the detection signal. The conductive film has a sheet resistance equal to or smaller than a predetermined resistance value, and has a
(Continued)

time constant larger than a predetermined minimum time constant defined by sampling timings in the touch detection circuit.

20 Claims, 14 Drawing Sheets

Related U.S. Application Data continuation of application No. 13/227,019, filed on Sep. 7, 2011, now Pat. No. 9,442,608.

(51) Int. Cl.
*G06F 3/045* (2006.01)
*G09G 5/00* (2006.01)
*B32B 7/00* (2019.01)

(58) Field of Classification Search
USPC .................................................. 345/173–184
See application file for complete search history.

(56) References Cited

U.S. PATENT DOCUMENTS

| | | | |
|---|---|---|---|
| 5,646,643 A | 7/1997 | Hirai et al. | |
| 6,366,277 B1 | 4/2002 | Armstrong | |
| 6,815,657 B2 | 11/2004 | Toyoshima et al. | |
| 2004/0217945 A1* | 11/2004 | Miyamoto | G06F 3/0412 345/173 |
| 2006/0279551 A1* | 12/2006 | Lii | G06F 3/044 345/173 |
| 2007/0069984 A1 | 3/2007 | Kim et al. | |
| 2008/0138589 A1* | 6/2008 | Wakabayashi | G06F 3/044 428/195.1 |
| 2009/0086114 A1 | 4/2009 | Higuchi et al. | |
| 2009/0091549 A1 | 4/2009 | Matsumoto | |
| 2009/0314551 A1 | 12/2009 | Nakajima | |
| 2010/0026636 A1 | 2/2010 | Jang et al. | |
| 2010/0033443 A1* | 2/2010 | Hashimoto | G06F 3/0418 345/173 |
| 2010/0182273 A1 | 7/2010 | Noguchi et al. | |
| 2010/0201640 A1* | 8/2010 | Nozawa | G06F 3/045 345/173 |
| 2011/0057899 A1* | 3/2011 | Sleeman | G01L 1/146 345/174 |
| 2011/0227858 A1 | 9/2011 | An et al. | |
| 2011/0297642 A1 | 12/2011 | Allemand et al. | |
| 2011/0310059 A1 | 12/2011 | Milyamoto et al. | |
| 2012/0012847 A1 | 1/2012 | Koyama et al. | |

FOREIGN PATENT DOCUMENTS

| | | |
|---|---|---|
| JP | 2008-129708 | 6/2008 |
| JP | 2009-086077 | 4/2009 |
| JP | 2009-244958 | 10/2009 |
| KR | 201110264222 | 3/2004 |

OTHER PUBLICATIONS

Korean Office Examination report issued in corresponding Korean Patent Application No. 10-2011-0080479 dated Jul. 20, 2017.

* cited by examiner

DISPLAY DEVICE WITH TOUCH DETECTION FUNCTION, AND ELECTRONIC UNIT

RELATED APPLICATION DATA

This application is a continuation of U.S. patent application Ser. No. 15/223,377 filed Jul. 29, 2016, which is a continuation of U.S. patent application Ser. No. 13/227,019 filed Sep. 7, 2011, now U.S. Pat. No. 9,442,608 issued Sep. 13, 2016, the entireties of which are incorporated herein by reference to the extent permitted by law. The present application claims the benefit of priority to Japanese Patent Application No. JP 2010-205573 filed on Sep. 14, 2010 in the Japan Patent Office, the entirety of which is incorporated by reference herein to the extent permitted by law.

BACKGROUND

This disclosure relates to a display device with a touch detection function, and in particular, to a display device with a touch detection function detecting touch events based on a change in an electrostatic capacitance caused by an external proximity object, and an electronic unit including such a display device with a touch detection function.

In recent years, a display device capable of inputting information by mounting a contact detection device, which is a so-called touch panel, on a display device such as a liquid crystal display device, or integrating the touch panel and the display device, and displaying various button images and the like on the display device instead of typical mechanical buttons has attracted attention. The display device including such a touch panel does not require input devices such as a keyboard, a mouse, and a keypad, and therefore there is a tendency to expand the use of such a display device to portable information terminals such as mobile phones, in addition to computers.

As a method used in a touch detection device, some methods such as optical method and a resistance method exist. However, an electrostatic capacitance type touch detection device is promising which has a relatively simple configuration, is capable of detecting touch events at plural positions at a time, and is capable of achieving low power consumption which is considerable particularly for mobile terminals or the like. For example, Japanese Unexamined Patent Application Publication No. 2008-129708 (JP-A-2008-129708) discloses a touch detection device including a plurality of X-direction electrodes and a plurality of Y-direction electrodes which is disposed to face the X-direction electrodes, and detecting touch events with use of a change of an electrostatic capacitance caused by an external proximity object, the electrostatic capacitance being formed at each intersection between the X-direction electrodes and the Y-direction electrodes. In addition, for example, in Japanese Unexamined Patent Application Publication No. 2009-244958 (JP-A-2009-244958), a display device incorporating a touch detection function, in which a common electrode for display originally provided in the display device is shared as one of a pair of electrodes for a touch sensor, and the other of the pair of the electrodes (touch detection electrode) is disposed to intersect with the common electrode has been proposed.

Typically, measures against electro static discharge (ESD) are important in electronic units. Static electricity is possibly applied to an electronic unit, for example, in manufacturing the electronic unit and in its use by a user. For a touch detection device, some ESD protection measures have been proposed. For example, in Japanese Unexamined Patent Application Publication No. 2009-86077 (JP-A-2009-86077), a display device mounted with a resistance film type touch detection device on a liquid crystal display panel has been described. In the display device, to eliminate static electricity generated at the time of bonding a polarizing plate in manufacturing process of the liquid crystal display panel, a transparent conductive film is formed on the liquid crystal display panel so as to be in an electrically floating state, and after the polarizing plate is bonded, a jig is allowed to be in contact with the transparent conductive film.

SUMMARY

However, in the above described JP-A-2008-129708 and JP-A-2009-244958 relating to an electrostatic capacitance type touch detection device having various advantages, ESD protection measures have not been described at all. In the display device with a touch detection function described in JP-A-2008-129708 or JP-A-2009-244958, display is possibly disturbed in response to application of static electricity by ESD. Particularly, display is possibly disturbed for a long time in a region apart from an electrode for touch detection since static electricity is difficult to be released. Moreover, like the display device with a touch detection function described in JP-A-2008-129708, in a case where dummy electrodes for improving optical characteristics are arranged in the region, display is possibly disturbed for a further long time since the dummy electrodes are charged with static electricity.

In a display device described in JP-A-2009-86077, the transparent conductive film is in an electrically floating state. Therefore, for example, in its use, in a case where a charged finger touches a touch panel or other cases, there is a possibility that static electricity is charged in the transparent conductive film and becomes difficult to be released from the transparent conductive film. In addition, in JP-A-2009-86077, provision of the transparent conductive film in a case where a resistance film type touch detection device is mounted is described; however, a case of an electrostatic capacitance type touch detection device is not described.

It is desirable to provide a display device with a touch detection function and an electronic unit capable of reducing disturbance of display even in a case where static electricity is applied.

A display device with a touch detection function according to an embodiment of the disclosure includes a plurality of liquid crystal display elements, a plurality of touch detection electrodes, a conductive film, and a touch detection circuit. The liquid crystal display elements perform display operation. The plurality of touch detection electrodes is arranged side by side to extend in one direction, and each outputs a detection signal based on a change in an electrostatic capacitance caused by an external proximity object. The conductive film is insulated from or is connected with high resistance to the touch detection electrodes, and is disposed to cover the touch detection electrodes. The touch detection circuit detects the external proximity object by sampling the detection signal. The conductive film has a sheet resistance equal to or smaller than a predetermined resistance value, and a time constant larger than a predetermined minimum time constant defined by sampling timings in the touch detection circuit.

An electronic unit according to an embodiment of the disclosure includes the above-described display device with a touch detection function, and corresponds to, for example, a television device, a digital camera, a personal computer, a video camera, and a portable terminal device such as a mobile phone.

In the display device with a touch detection function and the electronic unit according to the embodiments of the disclosure, when static electricity is applied, the sheet resistance of the conductive film is set to the predetermined resistance value or smaller in order to release the static electricity to the touch detection electrodes through the conductive film. In addition, to suppress reduction of touch detection sensitivity due to provision of the conductive film, the time constant of the conductive film is set to be larger than the predetermined minimum time constant.

In the display device with a touch detection function according to the embodiment of the disclosure, for example, the predetermined resistance value is desirably $10^{12}$ Ω/sq. Moreover, for example, the touch detection circuit may detect the external proximity object based on a difference between a sampling result at a start timing of a detection period and a sampling result at an end timing thereof. The detection period is set so as to include a transition timing of the detection signal therewithin, and the predetermined minimum time constant may be set to the time of the detection period. In this case, the time constant of the conductive film may be, for example, equal to or more than ten times or hundred times the predetermined minimum time constant.

Moreover, for example, the display device with a touch detection function according to the embodiment of the disclosure may further include a polarizing plate, and the conductive film may be formed integrally with the polarizing plate. Furthermore, for example, the conductive film is desirably disposed to cover at least an effective display region in which the liquid crystal display elements perform display operation.

In addition, for example, the display device with a touch detection function according to the embodiment of the disclosure may further include a plurality of drive electrodes arranged side by side to extend in a direction intersecting with the plurality of touch detection electrodes, and an electrostatic capacitance may be formed at each intersection of the plurality of touch detection electrodes and the plurality of drive electrodes. In this case, the conductive film is arranged on, for example, an opposite side of a detection electrode layer from the drive electrodes, the detection electrode layer including the touch detection electrodes, and a distance between the drive electrodes and the detection electrode layer is desirably larger than a distance between the conductive film and the detection electrode layer.

For example, the display device with a touch detection function according to the embodiment of the disclosure may further include dummy electrodes which are arranged between the plurality of touch detection electrodes and are in electrically floating state. In this case, for example, a space between the touch detection electrode and the dummy electrode adjacent to each other is desirably equal to or smaller than 50 μm. In addition, for example, in the effective display region, a total arrangement area of the touch detection electrodes and the dummy electrodes is desirably 50% of the area of the effective display region or more.

For example, the conductive film is desirably supplied with a constant voltage. In addition, the touch detection electrodes may be arranged side by side with a pitch of 10 mm or less.

For example, the liquid crystal display elements may be configured to include a liquid crystal layer and pixel electrodes arranged to face the drive electrodes with the liquid crystal layer in between. In addition, for example, the liquid crystal display elements may be configured to include a liquid crystal layer and pixel electrodes which are arranged between the liquid crystal layer and the drive electrodes or are arranged on a side opposite to the liquid crystal layer with the drive electrodes in between.

In the display device with a touch detection function and the electronic unit according to the embodiments of the disclosure, the sheet resistance of the conductive film is set to the predetermined resistance value or smaller, and the time constant is set to the predetermined minimum time constant or larger. Therefore, the display device with a touch detection function and the electronic unit capable of reducing disturbance of display even when ESD is applied may be realized.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, preferred embodiments of the disclosure will be described in detail with reference to drawings. Note that the description will be given in the following order.
1. Basic principle of electrostatic capacitance type touch detection
2. Embodiment
3. Application examples 1. Basic Principle of Electrostatic Capacitance Type Touch Detection First, a basic principle of touch detection in a display device with a touch detection function according to an embodiment of the disclosure will be described with reference to FIG. 1 to FIG. 3. The touch detection method is implemented as an electrostatic capacitance type touch sensor, and a capacitance element is configured with use of a pair of electrodes (a drive electrode E1 and a touch detection electrode E2) facing each other with a dielectric body D in between as illustrated in (A) of FIG. 1. The configuration is represented as an equivalent circuit illustrated in (B) of FIG. 1. A capacitance element C1 is configured of the drive electrode E1, the touch detection electrode E2, and the dielectric body D. One end of the capacitance element C1 is connected to an alternating signal source (a drive signal source) S, and the other end P is grounded through a resistor R and is connected to a voltage detector (a touch detection circuit) DET. When an alternating rectangular wave Sg ((B) of FIG. 3) with a predetermined frequency (for example, about several kHz to several tens kHz) is applied to the drive electrode E1 (one end of the capacitance element C1) from the alternating signal source S, an output waveform (a touch detection signal Vdet) illustrated in (A) of FIG. 3 appears in the touch detection electrode E2 (the other end P of the capacitance element C1).

Note that the alternating rectangular wave Sg corresponds to a drive signal Vcom described later.

Figure 1:
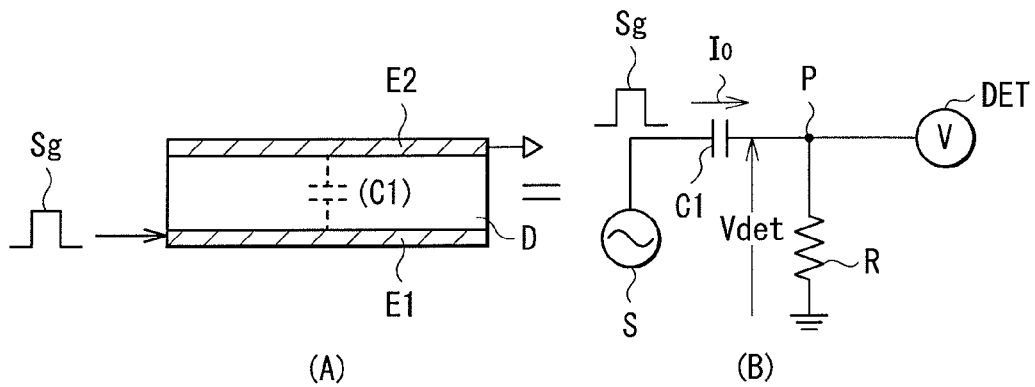
FIG. 1 is a diagram for describing a basic principle of a touch detection method in a display device with a touch detection function according to an embodiment of the disclosure, and a diagram illustrating a state where a finger is not in contact with or not in proximity to the display device.

In a state where a finger is not in contact with (or not in proximity to) the display device, as illustrated in FIG. 1, a current I0 according to the capacitance value of the capacitance element C1 flows in response to charge and discharge with respect to the capacitance element C1. The other end P of the capacitance element C1 at this time has a potential waveform like a waveform V0 in (A) of FIG. 3, and the waveform is detected by the voltage detector DET.

Figure 2:
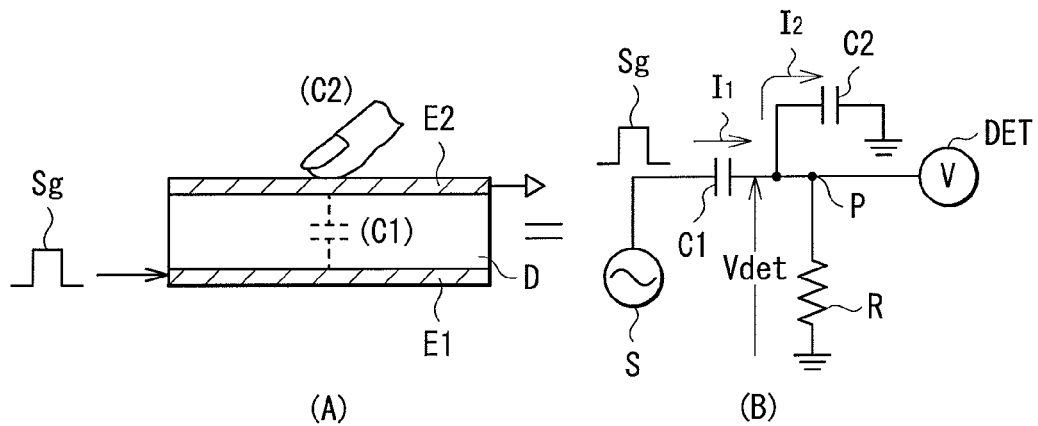
FIG. 2 is a diagram for describing the basic principle of the touch detection method in the display device with a touch detection function according to the embodiment of the disclosure, and a diagram illustrating a state where a finger is in contact with or in proximity to the display device.
Figure 3:
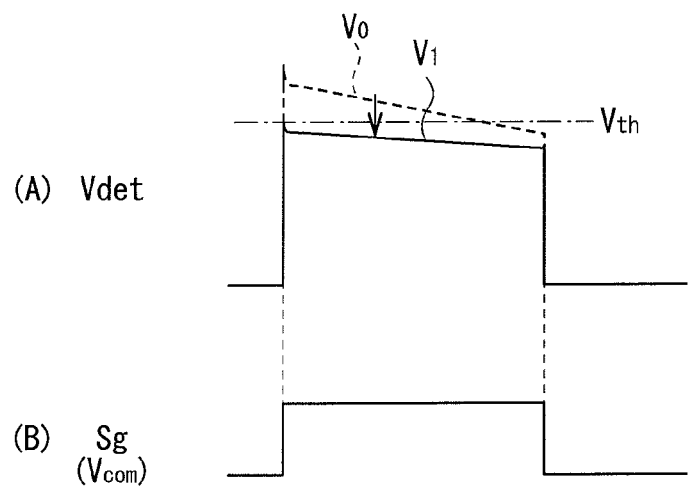
FIG. 3 is a diagram for describing the basic principle of the touch detection method in the display device with a touch detection function according to the embodiment of the disclosure, and a diagram illustrating an example of a waveform of a drive signal and a touch detection signal.

On the other hand, in a state where a finger is in contact with (or in proximity to) the display device, as illustrated in FIG. 2, a capacitance element C2 formed by the finger is added in series with the capacitance element C1. In this state, currents I1 and I2 flow in response to charge and discharge with respect to the capacitance elements C1 and C2, respectively. The other end P of the capacitance element C1 at this time has a potential waveform like a waveform V1 in (A) of FIG. 3, and the waveform is detected by the voltage detector DET. At this time, the potential of the point P is a partial potential determined by values of the currents I1 and I2 flowing through the capacitance elements C1 and C2. Therefore, the waveform V1 is a smaller value than that of the waveform V0 in a non-contact state. The voltage detector DET compares the detected voltage with a predetermined threshold voltage Vth to determine the non-contact state when the detected voltage is equal to or larger than the threshold voltage, and to determine a contact state when the detected voltage is smaller than the threshold voltage. In such a way, touch detection is achievable.

2. Embodiment

Configuration Example
(General Configuration Example)

Figure 4:
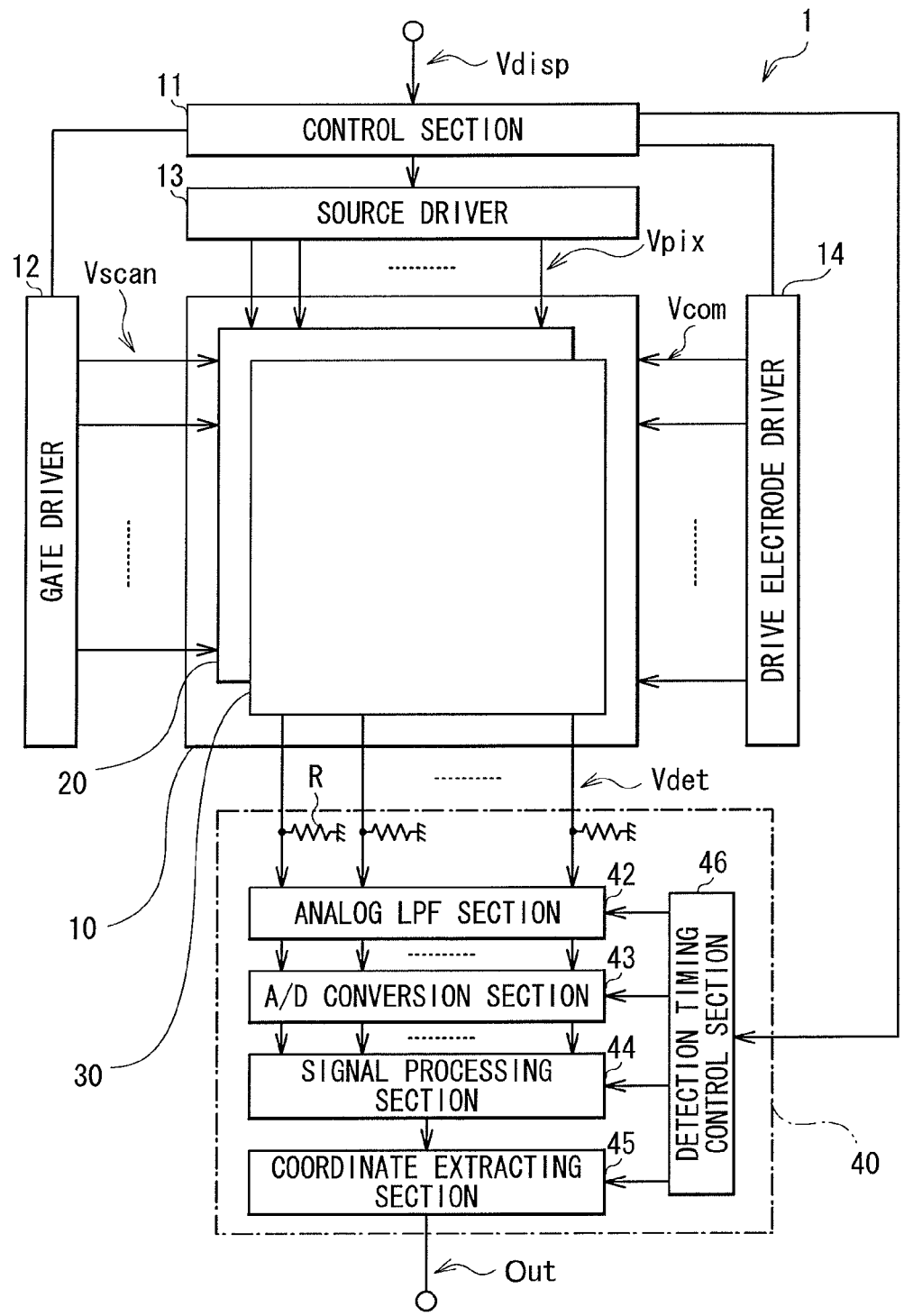
FIG. 4 is a block diagram illustrating a configuration example of a display device with a touch detection function according to the embodiment of the disclosure.

FIG. 4 illustrates a configuration example of a display device with a touch detection function 1 according to an embodiment of the disclosure. The display device with a touch detection function uses a liquid crystal display element as a display element, and is of a so-called in-cell type in which a liquid crystal display section configured by the liquid crystal display element, and an electrostatic capacitance type touch detection section are integrated.

The display device with a touch detection function 1 includes a control section 11, a gate driver 12, a source driver 13, a drive electrode driver 14, a display section with a touch detection function 10, and a touch detection circuit 40.

The control section 11 is a circuit supplying a control signal to each of the gate driver 12, the source driver 13, the drive electrode driver 14, and the touch detection circuit 40 based on a picture signal Vdisp supplied from outside, and controlling these parts to operate in synchronization with one another.

The gate driver 12 has a function to sequentially select one horizontal line which is a target of display drive of the display section with a touch detection function 10, based on the control signal supplied from the control section 11. Specifically, as described later, the gate driver 12 applies a scan signal Vscan to a gate of a TFT element Tr of a pixel Pix through a scan signal line GCL to sequentially select, as a target of display drive, one row (one horizontal line) in the pixels Pix formed in a matrix in a liquid crystal display section 20 of the display section with a touch detection function 10.

The source driver 13 is a circuit supplying a pixel signal Vpix to each pixel Pix (described later) in the display section with a touch detection function 10 based on the control signal supplied from the control section 11. Specifically, the source driver 13 supplies the pixel signal Vpix to each pixel Pix configuring one horizontal line sequentially selected by the gate driver 12 through a pixel signal line SGL as described later. Then, in the pixels Pix, display for the horizontal line is performed in response to the supplied pixel signal Vpix.

The drive electrode driver 14 is a circuit supplying the drive signal Vcom to drive electrodes COML (described later) of the display section with a touch detection function 10 based on the control signal supplied from the control section 11. Specifically, the drive electrode driver 14 sequentially applies the drive signal Vcom to the drive electrodes COML in a time-divisional manner. Then, a touch detection section 30 outputs a touch detection signal Vdet based on the drive signal Vcom from a plurality of touch detection electrodes TDL (described later), and supplies the signal to the touch detection circuit 40.

The display section with a touch detection function 10 is a display section incorporating a touch detection function. The display section with a touch detection function 10 includes the liquid crystal display section 20 and the touch detection section 30. As described later, the liquid crystal display section 20 is a section performing sequential scan on one horizontal line basis to perform display according to the scan signal Vscan supplied from the gate driver 12. The touch detection section 30 operates based on the above-described basic principle of the electrostatic capacitance type touch detection, and outputs the touch detection signal Vdet. As described later, the touch detection section 30 performs sequential scan according to the drive signal Vcom supplied from the drive electrode driver 14 to perform touch detection.

The touch detection circuit 40 is a circuit detecting the presence of touch events with respect to the touch detection section 30 based on the control signal supplied from the control section 11 and the touch detection signal Vdet supplied from the touch detection section 30 of the display section with a touch detection function 10, and when the touch event is detected, the touch detection circuit 40 determines the coordinate and the like in a touch detection region. The touch detection circuit 40 includes an analog LPF (low pass filter) section 42, an A/D conversion section 43, a signal processing section 44, a coordinate extracting section 45, and a detection timing control section 46. The analog LPF section 42 is a low-pass analog filter which removes high-frequency component (noise component) contained in the touch detection signal Vdet supplied from the touch detection section 30 to extract touch component, and outputs each of the touch component. A resistor R for applying a direct-current potential (0V) is connected between each input terminal of the analog LPF section 42 and the ground. Incidentally, by providing a switch, for example, instead of the resistor R and turning the switch on at a predetermined time, the direct-current potential (0V) may be provided. The A/D conversion section 43 is a circuit converting each analog signal output from the analog LPF section 42 into a digital signal by sampling at timings in synchronization with the drive signal Vcom. The signal processing section 44 is a logic circuit detecting the presence of touch events with respect to the touch detection section 30 based on the output signal of the A/D conversion section 43. The coordinate extracting section 45 is a logic circuit determining a touch panel coordinate when the touch event is detected by the signal processing section 44. The detection timing control section 46 controls these circuits to operate in synchronization with one another.

(Display Section with Touch Detection Function 10)

Next, the configuration example of the display section with a touch detection function 10 will be described in detail.

Figure 5:
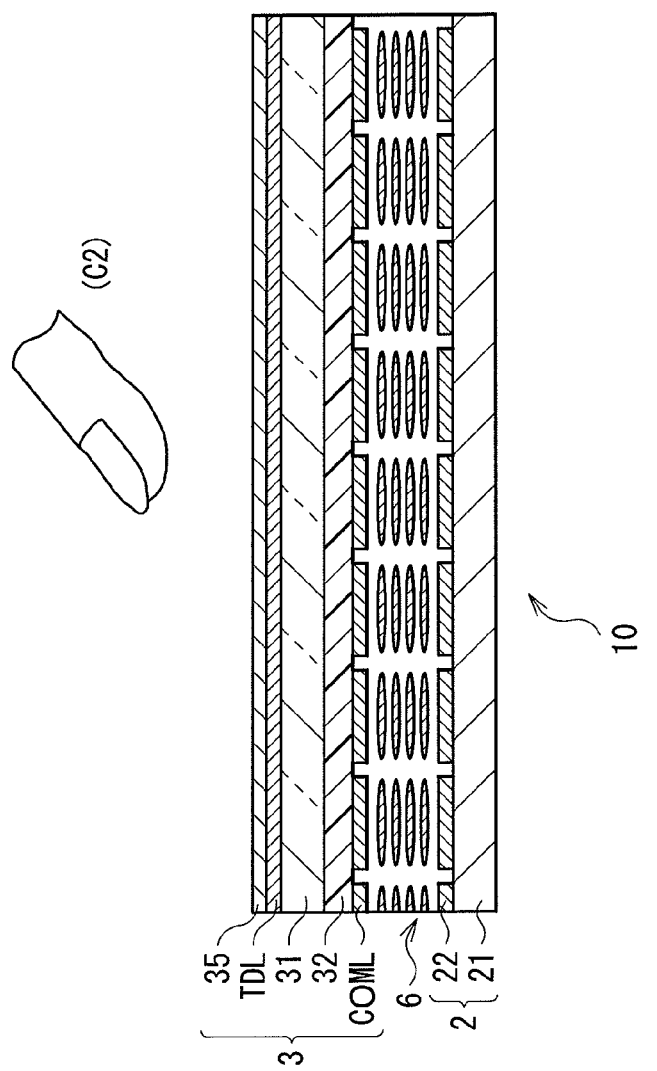
FIG. 5 is a sectional view illustrating a schematic cross-sectional configuration of a display section with a touch detection function illustrated in FIG. 4.

FIG. 5 illustrates an example of a cross-sectional configuration of a relevant part of the display section with a touch detection function 10. The display section with a touch detection function 10 has a pixel substrate 2, a facing substrate 3 disposed to face the pixel substrate 2, and a liquid crystal layer 6 inserted between the pixel substrate 2 and the facing substrate 3.

The pixel substrate 2 includes a TFT substrate 21 as a circuit substrate and a plurality of pixel electrodes 22 arranged in a matrix on the TFT substrate 21. In the TFT substrate 21, although not illustrated, thin film transistors (TFTs) for each pixels and wirings such as the pixel signal line SGL for supplying the pixel signal Vpix to each of the pixel electrodes 22 and the scan signal line GCL for driving each of the TFTs are formed.

The facing substrate 3 includes a glass substrate 31, a color filter 32 formed on a surface of the glass substrate 31, and a plurality of drive electrodes COML formed on the color filter 32. The color filter 32 is configured by, for example, cyclically arranging three color filter layers of red (R), green (G), and blue (B), and a set of three colors of R, G, and B corresponds to each display pixel. The drive electrodes COML function as common drive electrodes for the liquid crystal display section 20, and also function as drive electrodes for the touch detection section 30. Note that in this example, although the drive electrodes COML are shared for display and for touch detection, the drive electrodes for display and for touch detection may be separately provided. In addition, for example, instead of the drive electrodes COML, the scan signal line GCL or the pixel signal line SGL may be shared as drive electrodes for the touch detection section 30. In these cases, when the scan signal line GCL or the pixel signal line SGL is made of a low resistance material such as Mo and Al, a low resistance drive electrode is achievable. The drive electrodes COML are connected to the TFT substrate 21 through an contact conductive cylinder (not illustrated), and the drive signal Vcom with the alternating rectangular waveform is applied from the TFT substrate 21 to the drive electrodes COML through the contact conductive cylinder. On the other surface of the glass substrate 31, the touch detection electrodes TDL as detection electrodes of the touch detection section 30 are formed. Each of the touch detection electrodes TDL is made of ITO (indium tin oxide), IZO, SnO, an organic conductive film, and the like, and has translucency. Note that each of the touch detection electrodes TDL may have, for example, an aperture at a portion corresponding to a pixel of color light with low transmittance in the electrode (a pixel of blue (B) in a case of ITO). Further, a polarizing plate 35 is disposed on the touch detection electrodes TDL. Incidentally, on the polarizing plate 35, a cover window configured of glass, film, plastic or the like may be arranged.

The liquid crystal layer 6 modulates light passing therethrough according to a state of electric field, and liquid crystal of various modes such as TN (twisted nematic), VA (vertical alignment), and ECB (electrically controlled birefringence) is used.

Incidentally, alignment films are disposed between the liquid crystal layer 6 and the pixel substrate 2, and between the liquid crystal layer 6 and the facing substrate 3. In addition, an incident-side polarizing plate is disposed on a bottom surface side of the pixel substrate 2, which is not illustrated in the figure.

Figure 6:
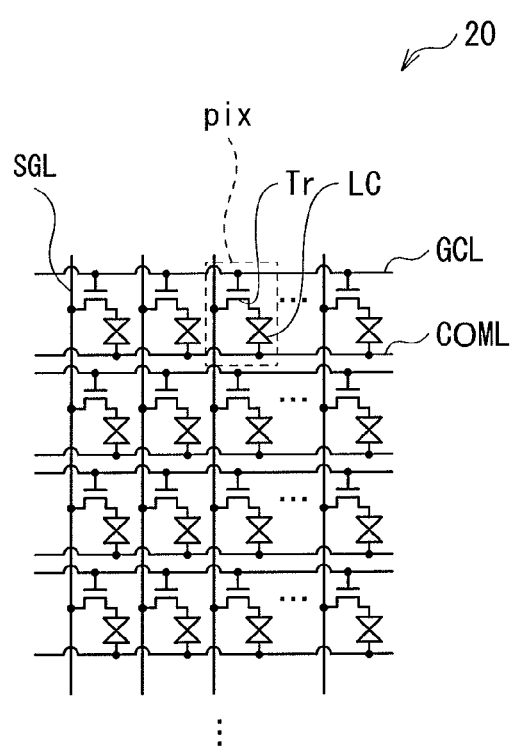
FIG. 6 is a circuit diagram illustrating a pixel arrangement of the display section with a touch detection function illustrated in FIG. 4.

FIG. 6 illustrates a configuration example of a pixel configuration in the liquid crystal display section 20. The liquid crystal display section 20 has the plurality of pixels Pix arranged in a matrix. Each of the pixels Pix has a TFT element Tr and a liquid crystal element LC. The TFT element Tr is configured of a thin film transistor, and in this example, the TFT element Tr is configured of an n-channel MOS (metal oxide semiconductor) TFT. A source of the TFT element Tr is connected to the pixel signal line SGL, a gate thereof is connected to the scan signal line GCL, and a drain thereof is connected to one end of the liquid crystal element LC. One end of the liquid crystal element LC is connected to the drain of the TFT element Tr, and the other end thereof is connected to the drive electrode COML.

Each of the pixels Pix is connected mutually, through the scan signal line GCL, to the other pixels Pix which are in the same row of the liquid crystal display section 20. The scan signal line GCL is connected to the gate driver 12, and the scan signal Vscan is supplied from the gate driver 12. In addition, each of the pixels Pix is connected mutually, through the pixel signal line SGL, to the other pixels Pix which are in the same column of the liquid crystal display section 20. The pixel signal line SGL is connected to the source driver 13, and the pixel signal Vpix is supplied from the source driver 13.

Moreover, each of the pixels Pix is connected mutually, through the drive electrode COML, to the other pixels Pix which are in the same row of the liquid crystal display section 20. The drive electrodes COML are connected to the drive electrode driver 14, and the drive signal Vcom is supplied from the drive electrode driver 14.

With this configuration, in the liquid crystal display section 20, the gate driver 12 drives the scan signal line GCL to perform line-sequential scanning in a time-divisional manner so that one horizontal line is sequentially selected. Then, the source driver 13 supplies the pixel signal Vpix to the pixels Pix in the selected horizontal line to perform display on one horizontal line basis.

Figure 7:
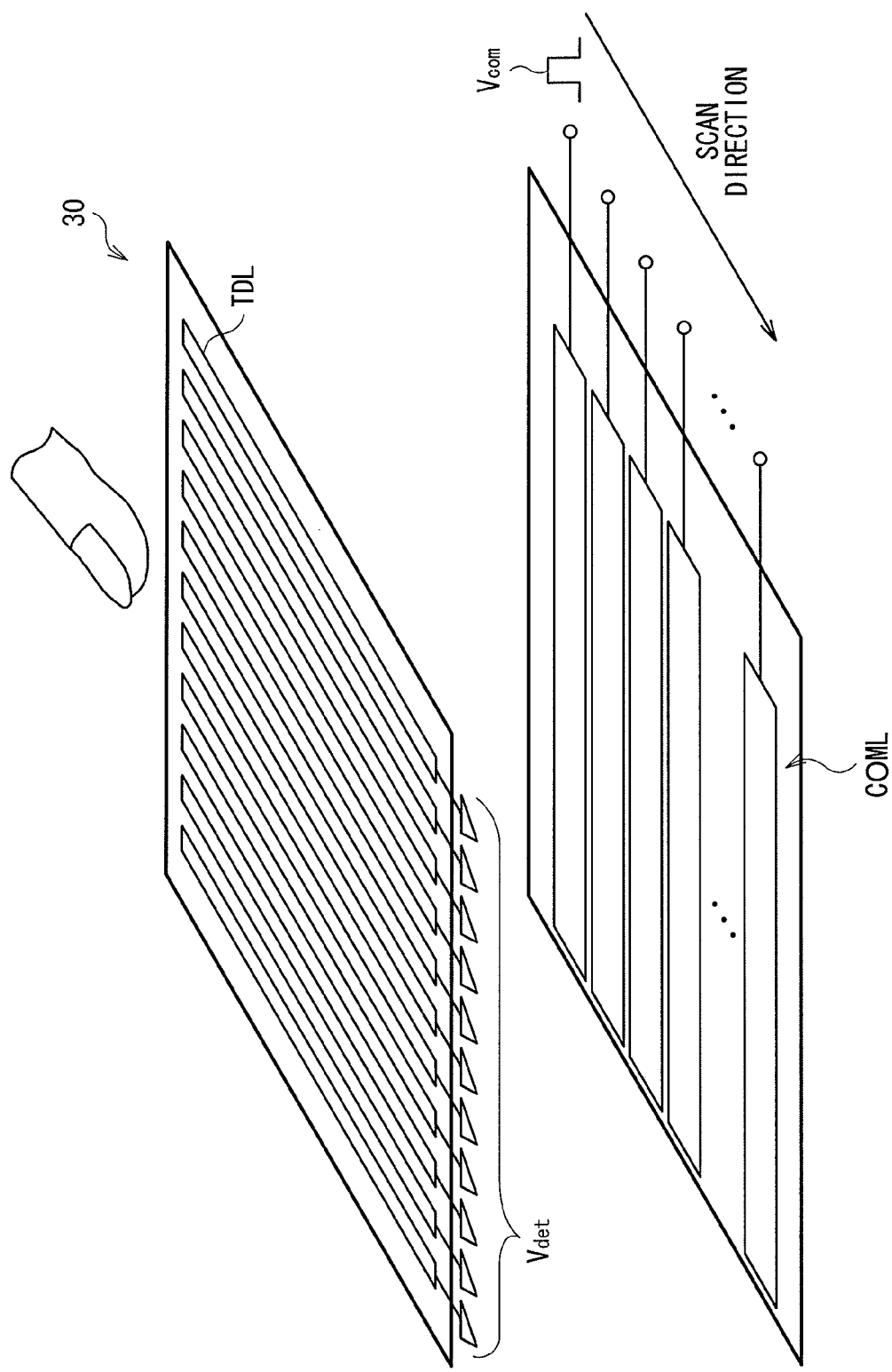
FIG. 7 is a perspective view illustrating a configuration example of drive electrodes and touch detection electrodes of the display section with a touch detection function illustrated in FIG. 4.

FIG. 7 is a perspective view illustrating a configuration example of the touch detection section 30. The touch detection section 30 is configured of the drive electrodes COML and the touch detection electrodes TDL arranged in the facing substrate 3. Each of the drive electrodes COML is configured of a stripe-shaped electrode pattern extending in a lateral direction of the figure. When touch detection operation is performed, the drive signal Vcom is sequentially supplied to each of the electrode patterns by the drive electrode driver 14, and sequential scan drive is performed in a time-divisional manner. Each of the touch detection electrodes TDL is configured of an electrode pattern extending in a direction orthogonal to an extending direction of the electrode pattern of each of the drive electrodes COML. As described later, dummy electrodes 37 (not illustrated) are arranged between the touch detection electrodes TDL. The electrode pattern of each of the touch detection electrodes TDL is connected to the touch detection circuit 40. The electrode patterns of the drive electrode COML and the electrode patterns of the touch detection electrodes TDL intersecting with each other form an electrostatic capacitance at each intersection.

With this configuration, in the touch detection section 30, the drive electrode driver 14 applies the drive signal Vcom to the drive electrodes COML to output the touch detection signal Vdet from the touch detection electrodes TDL, and therefore touch detection is performed. The drive electrodes COML correspond to the drive electrode E1 in the basic principle of the touch detection illustrated in FIG. 1 to FIG. 3, the touch detection electrodes TDL correspond to the touch detection electrode E2, and the touch detection section 30 detects touch events in accordance with the basic principle. As illustrated in FIG. 7, the electrode patterns intersecting with each other configure an electrostatic capacitance type touch sensor in a matrix. Therefore, scan is performed over the entire touch detection surface of the touch detection section 30 so that a contact position or a proximal position of the external proximity object is also detectable.

Figure 8:
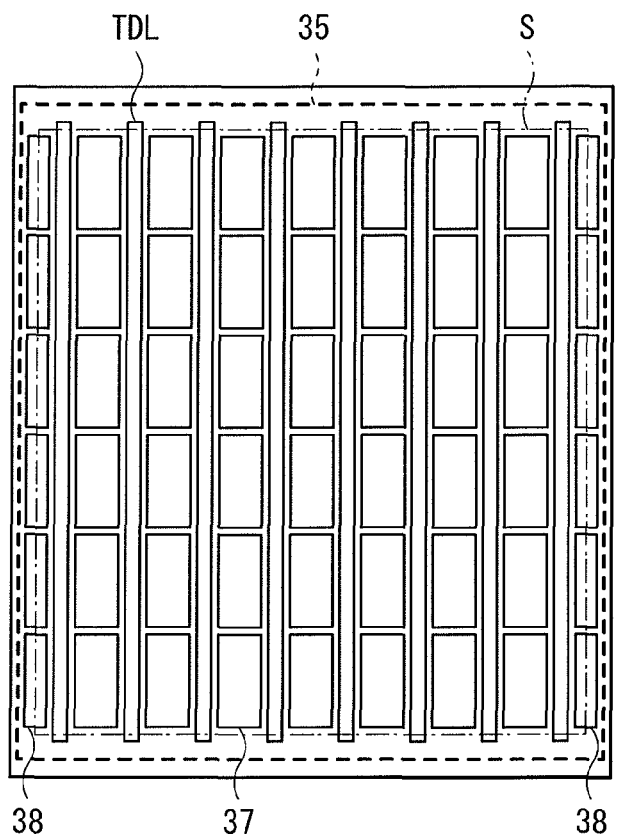
FIG. 8 is a plane view illustrating a configuration example of the touch detection electrodes of the display section with a touch detection function illustrated in FIG. 4.

FIG. 8 illustrates a configuration example of the touch detection electrodes TDL. The touch detection electrodes TDL are arranged side by side with, for example, a pitch of 5 mm in an effective display region S. The dummy electrodes 37 are arranged between the touch detection electrodes TDL, and the dummy electrodes 38 are arranged at the outer side of each of the touch detection electrodes TDL which are arranged at both sides of the effective display region S. The dummy electrodes 37 and 38 allow the touch detection electrodes TDL to be hardly viewed from the outside, and are in an electrically floating state. The polarizing plate 35 is disposed in a region wider than the effective display region S. In other words, a conductive layer 52 (described later) formed in the polarizing plate 35 is disposed to cover the effective display region S. Note that eight touch detection electrodes TDL are illustrated in FIG. 8, however, the number of the touch detection electrodes TDL in the effective display region S is not limited thereto, and may be, for example, nine or more, or seven or less. In addition, in FIG. 8, although the touch detection electrodes TDL and the dummy electrodes 37 are formed in a region in which the conductive layer 52 (the polarizing plate 35) is disposed, this is not limitative. The touch detection electrodes TDL and the dummy electrodes 37 may be formed outside of the region in which the conductive layer 52 is disposed.

Figure 9:
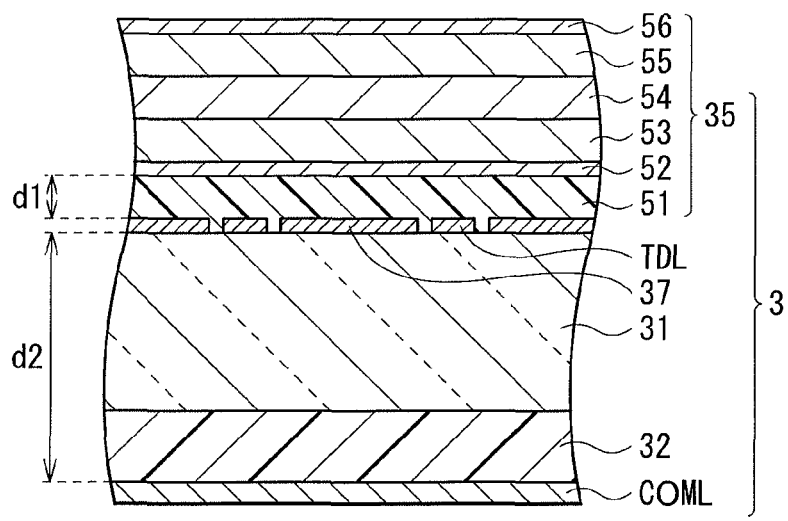
FIG. 9 is a sectional view illustrating a configuration example of a polarizing plate illustrated in FIG. 5.

FIG. 9 illustrates a configuration example of the polarizing plate 35. The polarizing plate 35 has a polarizing layer 54 and the conductive layer 52. The polarizing layer 54 is a layer having a polarizing function. A cover layer 55 is formed on a surface of the polarizing layer 54, and a hard coat layer 56 is formed on the cover layer 55. A cover layer 53 is formed on a surface of the polarizing layer 54 opposite to the surface formed with the cover layer 55, and the conductive layer 52 is formed on the cover layer 53. The conductive layer 52 is a layer with translucency and conductivity, and is made of ITO, IZO, SnO, an organic conductive film, and the like. As described later, the conductive layer 52 is provided for ESD protection. The conductive layer 52 suppresses disturbance of display due to static electricity which is applied from the outside and is then transmitted to the liquid crystal layer, and suppresses degradation in touch detection sensitivity to minimum. On the conductive layer 52, an adhesion layer 51 is provided to bond the conductive layer 52 with the glass substrate 31 provided with the touch detection electrodes TDL and the dummy electrodes 37 and 38. As illustrated in FIG. 9, a distance d1 between the conductive layer 52 and the touch detection electrodes TDL is set to be smaller than a distance d2 between the touch detection electrodes TDL and the drive electrodes COML.

Here, the liquid crystal element LC corresponds to a specific example of "a liquid crystal display element" of the disclosure. The conductive layer 52 corresponds to a specific example of "a conductive film" of the disclosure.

[Operations and Functions]

Subsequently, operations and functions of the display device with a touch detection function 1 of the embodiment will be described.

(General Operation Outline)

The control section 11 supplies the control signal to each of the gate driver 12, the source driver 13, the drive electrode driver 14, and the touch detection circuit 40 based on the picture signal Vdisp supplied from the outside, and controls these parts to operate in synchronization with one another. The gate driver 12 supplies the scan signal Vscan to the liquid crystal display section 20 to sequentially select one horizontal line to be driven for display. The source driver 13 supplies the pixel signal Vpix to each pixel Pix configuring the horizontal line selected by the gate driver 12. The drive electrode driver 14 sequentially applies the drive signal Vcom to the drive electrodes COML. The display section with a touch detection function 10 performs display operation, and performs the touch detection operation based on the drive signal Vcom to output the touch detection signal Vdet from the touch detection electrodes TDL. The analog LPF section 42 removes high-frequency component from the touch detection signal Vdet to output the resultant signal. The A/D conversion section 43 converts an analog signal output from the analog LPF section 42 into a digital signal at timings in synchronization with the drive signal Vcom. The signal processing section 44 detects the presence of touch events with respect to the touch detection section 30 based on the output signal from the A/D conversion section 43. The coordinate extracting section 45 determines a touch panel coordinate in response to touch detection of the signal processing section 44. The detection timing control section 46 controls the analog LPF section 42, the A/D conversion section 43, the signal processing section 44, and the coordinate extracting section 45 to operate in synchronization with one another.

Figure 10:
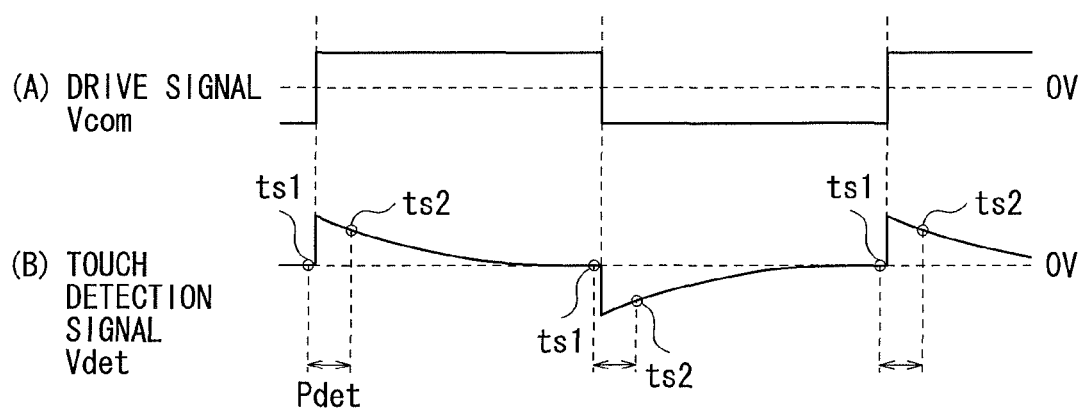
FIG. 10 is a timing waveform chart illustrating an operation example of touch detection operation in the display device with a touch detection function illustrated in FIG. 4.

FIG. 10 illustrates an operation example of the touch detection operation, where (A) illustrates a waveform of the drive signal Vcom, and (B) illustrates a waveform of the touch detection signal Vdet. The drive electrode driver 14 sequentially applies the drive signal Vcom with the alternating rectangular waveform illustrated in (A) of FIG. 10 to the drive electrodes COML. The drive signal Vcom is transmitted to the touch detection electrodes TDL through the electrostatic capacitance, causing an induced current to flow. Then, the touch detection signal Vdet is changed ((B) of FIG. 10). The A/D conversion section 43 samples, in a touch detection period Pdet, the output signal from the analog LPF section 42, which has received the touch detection signal Vdet, at sampling timings ts1 and ts2 in synchronization with the drive signal Vcom to perform A/D conversion ((B) of FIG. 10). The sampling timing ts1 corresponds to a start timing of the touch detection period Pdet, and is set immediately before a transition timing of the drive signal Vcom. In contrast, the sampling timing ts2 corresponds to an end timing of the touch detection period Pdet, and is set immediately after the transition timing of the drive signal Vcom. The signal processing section 44 of the touch detection circuit 40 performs touch detection based on a difference between an A/D conversion result at the sampling timing ts1 and an A/D conversion result at the sampling timing ts2. Here, the touch detection period Pdet corresponds to a specific example of "a detection period" of the disclosure.

Next, the conductive layer 52 will be described. The conductive layer 52 is provided for ESD protection in manufacturing the display device with a touch detection function 1 and in its use. In manufacturing, generally, for example, when a cover film is removed from a polarizing plate before adhesion of the polarizing plate, when a cover glass (a cover film, or a cover plastic) is adhered to a panel with a transparent adhesive agent, or when a human finger touches a touch detection surface (a surface of the hard coat layer 56) at the time of examination, the polarizing plate is possibly charged. In addition, in use of the display device with a touch detection function 1, when a charged finger of a user touches the touch detection surface, the polarizing plate is possibly charged. The conductive layer 52 functions to release the static electricity. In the following, functions of the conductive layer 52 and electric characteristics for achieving such functions will be described.

Figure 11:
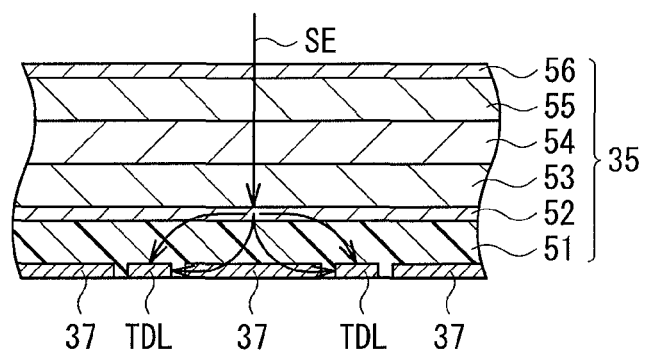
FIG. 11 is a schematic diagram illustrating an example of a flow of static electricity in the polarizing plate illustrated in FIG. 9.

FIG. 11 schematically illustrates a flow of static electricity when the static electricity is applied. In the display device with a touch detection function 1, for example, static electricity SE applied to the surface (the hard coat layer 56) of the polarizing plate 35 is first transmitted to the conductive layer 52 through the cover layer 55, the polarizing layer 54, and the cover layer 53. Then, the static electricity SE is transmitted through the conductive layer 52 and the dummy electrodes 37 to the touch detection electrodes TDL arranged therearound. After that, the static electricity SE transmitted to the touch detection electrodes TDL is allowed to be released to a power source of the display device with a touch detection function or GND through a resistor R (FIG. 4) provided at an input of the touch detection circuit 40 or an ESD protection circuit (not illustrated) provided in the input section thereof. In other words, in a case where the conductive layer 52 is not provided, the static electricity is charged to the polarizing plate itself, for example, and the electric field caused by the static electricity may disturb the alignment of liquid crystal molecules of the liquid crystal layer 6, and may disturb display. However, by providing the conductive layer 52, the static electricity is easily released, and the possibility of the disturbance of display may be reduced. As illustrated in FIG. 8, the conductive layer 52 is disposed to cover the effective display region S so that the static electricity is easily released and disturbance of display is reduced over the entire surface of the effective display region S.

Incidentally, the conductive layer 52 may be disposed to cover a wide region including the effective display region S. For example, by disposing the conductive layer 52 to cover a region of circuits arranged on the pixel substrate 2, breakdown of the circuits may be prevented when the static electricity is applied in manufacturing, and malfunction of the circuits may be reduced when the static electricity is applied in its use.

Each space between the touch electrode TDL and the dummy electrodes 37 or 38 adjacent to each other is desirably as narrow as possible in order to easily release the static electricity, and for example, is desirably set to 50 μm or less. Moreover, desirably, the touch detection electrodes TDL and the dummy electrodes 37 and 38 are arranged so as to have the total arrangement area as wide as possible in the effective display region S in order to easily release the static electricity. For example, the total arrangement area is desirably 50% of the area of the effective display region S or more.

It is desirable to make the conductive layer 52 have sufficiently low resistance in order to easily release the applied static electricity SE to the touch detection electrodes TDL arranged therearound. In other words, the resistance of the conductive layer 52 has an upper limit from the viewpoint of the ESD protection. Generally, it is known that, to effectively release the static electricity, the sheet resistance value of the conductive layer 52 is desirably equal to or lower than $1*10^{12}$ Ω/sq, and is preferably equal to or lower than $1*10^{11}$ Ω/sq.

On the other hand, if the resistance of the conductive layer 52 is excessively low, the touch detection sensitivity may be lowered. As illustrated in FIG. 7, the display device with a touch detection function 1 detects touch events with use of a change of the electrostatic capacitance between the drive electrodes COML and the touch detection electrodes TDL caused by the external proximity object. Therefore, if the resistance of the conductive layer 52 arranged between the touch detection electrodes TDL and the external proximity object is excessively low, the conductive layer 52 functions as a shield, and the electrostatic capacitance hardly changes in response to the external proximity object. In other words, in the touch detection signal Vdet, the touch component indicating the presence of the touch events is attenuated by the shield, the S/N ratio is lowered, and the touch detection sensitivity is accordingly lowered. As described above, the resistance of the conductive layer 52 has a lower limit from the viewpoint of the touch detection sensitivity.

In other words, the resistance of the conductive layer 52 need to be set to a value in a range between an upper limit defined from the viewpoint of the ESD protection and a lower limit defined from the viewpoint of the touch detection sensitivity.

Next, the lower limit of the resistance of the conductive layer 52 will be described in detail.

Figure 12:
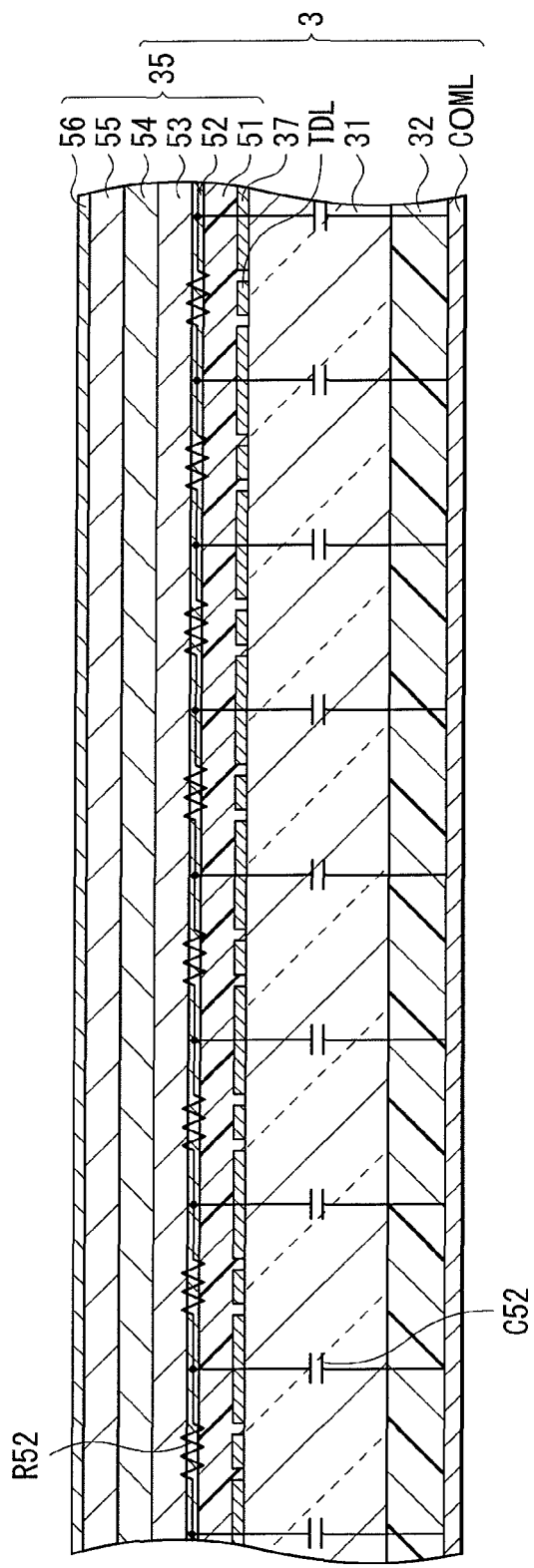
FIG. 12 is a schematic diagram for describing a time constant of a conductive film illustrated in FIG. 9.

FIG. 12 schematically illustrates the resistance of the conductive layer 52 and a capacitance between the conductive layer 52 and the drive electrode COML. To prevent the touch component of the touch detection signal Vdet from being attenuated by the conductive layer 52 (to increase the S/N ratio), for example, as illustrated in FIG. 10, the voltage of the conductive layer 52 needs to show a sufficiently small change when the touch detection signal Vdet changes according to the transition of the drive signal Vcom in the touch detection period Pdet. The voltage of the conductive layer 52 changes depending on a time constant $\tau(=R52 \cdot C52)$ of the conductive layer 52. Accordingly, to increase the S/N ratio, the time constant $\tau$ of the conductive layer 52 needs to be larger than a time tdet corresponding to the touch detection period Pdet.

Figure 13:
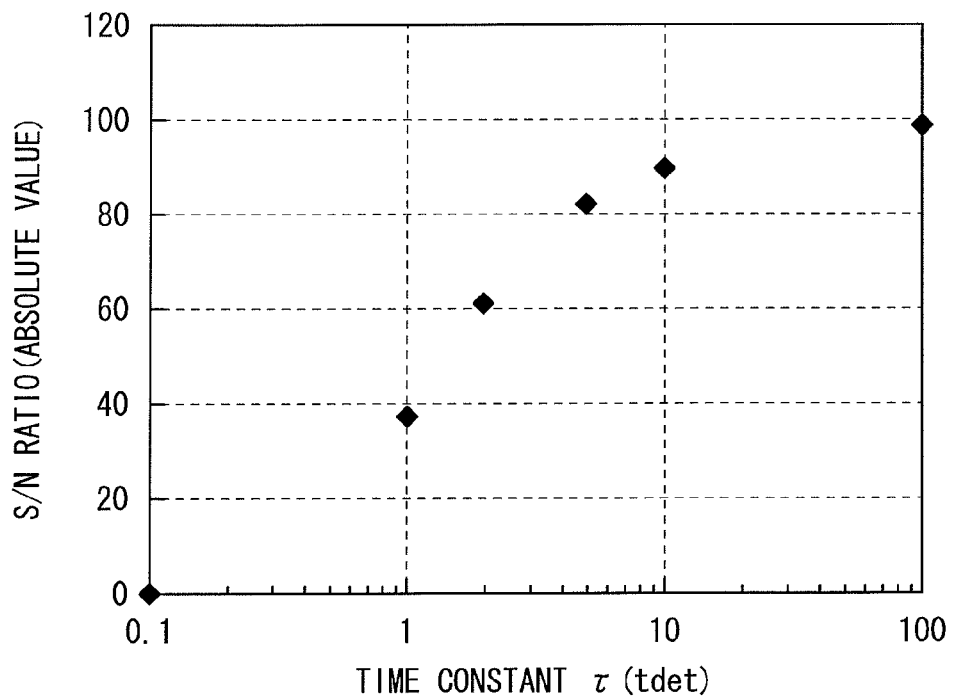
FIG. 13 is a plot illustrating a relationship between the time constant of the conductive film and S/N ratio of the touch detection signal.

FIG. 13 illustrates a relationship between the S/N ratio and the time constant $\tau$ of the conductive layer 52. The horizontal axis indicates the time constant $\tau$ of the conductive layer 52 using the time tdet as a unit. The vertical axis indicates the S/N ratio (relative value) when the S/N ratio at the time of the time constant $\tau$ being infinite (corresponding to a case where the conductive layer 52 is not provided) is defined as 100. Note that in this study, it is assumed that noise is not affected by the conductive layer 52, and is constant.

As illustrated in FIG. 13, when the time constant ti is small, the S/N ratio becomes small. This is because, as described above, the conductive layer 52 functions like a shield due to the small time constant $\tau$, and the touch component is accordingly attenuated. On the other hand, when the time constant $\tau$ becomes large, the influence of the conductive layer 52 is reduced and the S/N ratio is accordingly increased.

Although a necessary S/N ratio depends on use of the display device with a touch detection function 1, as illustrated in FIG. 13, for example, the time constant $\tau$ is desirably at least larger than the time tdet. At this time, the S/N ratio (relative value) is equal to or larger than 37. Moreover, the time constant $\tau$ is preferably equal to or larger than 10 times of the time tdet, and the S/N ratio at this time is equal to or larger than 90. Furthermore, it is more preferable that the time constant $\tau$ be equal to or larger than 100 times of the time tdet. At this time, the S/N ratio (relative value) is equal to or larger than 99, and the touch detection may be performed while being hardly affected by the conductive layer 52.

In such a way, the time constant $\tau$ of the conductive layer 52 is set to the above described value or larger so that the S/N ratios corresponding to respective values are obtained and the touch detection sensitivity is secured.

In addition, as illustrated in FIG. 8, the conductive layer 52 is disposed to cover the effective display region S. Therefore, in whichever portion within the effective display region S the touch events occur, the influence of the conductive layer 52 on the S/N ratio is constant, so that the variation of the touch detection sensitivity depending on the touch position is suppressed to minimum.

Effects

As described above, in the embodiment, the conductive layer is provided so that disturbance of display is reduced even in a case where static electricity is applied.

Moreover, in the embodiment, the time constant of the conductive layer is set to be larger than the time of the touch detection period so that lowering of the touch detection sensitivity is suppressed to minimum.

Further, in the embodiment, the conductive layer is provided in the polarizing plate to achieve integration so that manufacturing process is facilitated. In addition, the integration allows the distance between the conductive layer and the drive electrodes to be reduced. As a result, the time constant $\tau$ is increased as the capacitance C52 is increased, and therefore the S/N ratio is improved. Furthermore, when the resistor R52 is decreased with increase of the capacitance C52, the static electricity is allowed to be easily released.

Moreover, in the embodiment, the conductive layer is disposed to cover the effective display region. Therefore, the disturbance of display may be suppressed in the entire effective display region, and variation of the touch detection sensitivity depending on touch positions may be reduced.

Furthermore, in the embodiment, the distance d1 between the conductive layer and the touch detection electrodes is set to be smaller than the distance d2 between the touch detection electrodes and the drive electrodes. Therefore, the static electricity is allowed to be easily released. In addition, for example, in a case where the resistance of the conductive layer 52 is increased as the static electricity is allowed to be easily released, the lowering of the transmittance of the conductive layer or turbidity may be suppressed.

[Modification 1]

Figure 14A:
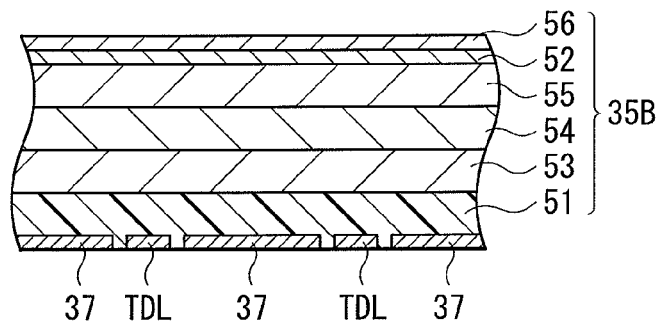
FIGS. 14A and 14B are sectional views illustrating a configuration example of a polarizing plate according to a modification.
Figure 14B:
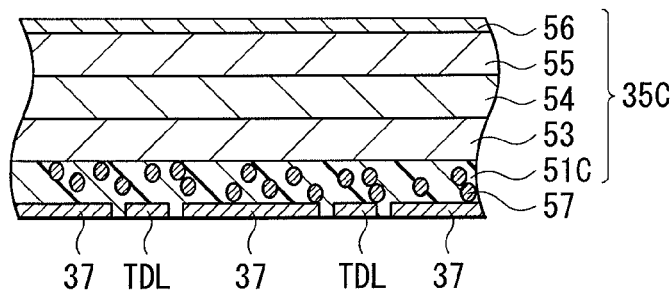

In the above-described embodiment, although the conductive layer 52 is provided between the adhesion layer 51 and the cover layer 53, this is not limitative. Alternatively, for example, the conductive layer 52 may be provided between the cover layer 55 and the hard coat layer 56 as illustrated in FIG. 14A, or the conductive layer 52 is formed by configuring an adhesion layer 51C with use of an adhesive agent including conductive particles 57 as illustrated in FIG. 14B. Also in this case, by adjusting size and amount of the conductive particles 57 included in the adhesive agent and characteristics of the conductive particles 57 such as conductivity, the static electricity may be effectively released, and the lowering of the touch detection sensitivity may be suppressed to minimum.

[Modification 2]

Figure 15:
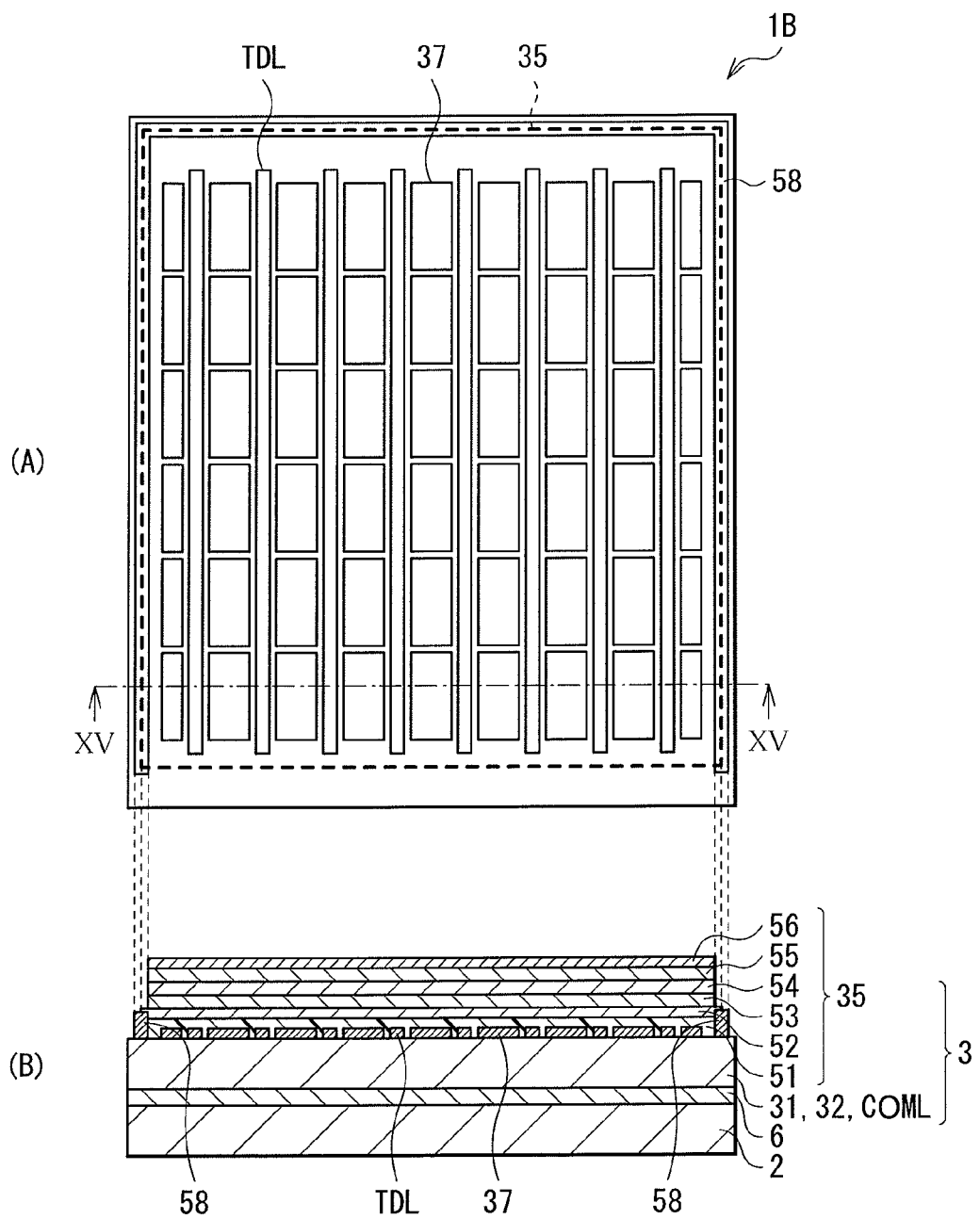
FIG. 15 is a plane view and a sectional view illustrating a configuration example of a display device with a touch detection function according to another modification.

In the above-described embodiment, although the applied static electricity is released through the touch detection electrodes TDL, this is not limitative. The other path may be provided for releasing the static electricity. FIG. 15 illustrates a configuration example of a display device with a touch detection function 1B according to a modification 2, where (A) is a plane view, and (B) is a schematic sectional view in the XV-XV arrow direction of (A) of FIG. 15. The display device with a touch detection function 1B has a GND line 58. The GND line 58 is arranged around the polarizing plate 35, is electrically connected to the conductive layer 52 of the polarizing plate 35, and is connected to GND of the display device with a touch detection function 1B. Accordingly, in the display device with a touch detection function 1B, the applied static electricity may be easily released to GND through the conductive layer 52.

In the display device with a touch detection function 1 according to the above-described embodiment, for example, in a case where a switch is provided in an input of the touch detection circuit 40 connected with the touch detection electrodes TDL and the switch is turned on only at a detection timing, the pass for releasing the static electricity is secured when the switch is in on state. However, when the switch is in off state, the pass is blocked and thus, there is a possibility that the static electricity is insufficiently released. Even in this case, in the display device with a touch detection function 1B according to the modification 2, since the GND line 58 is connected to the conductive layer 52 at all times, the pass for releasing the static electricity is secured at all times, allowing the static electricity to be easily released.

[Other Modifications]

In the above-described embodiment, although the touch detection electrodes TDL are arranged side by side with a pitch of 5 mm, this is not limitative. When the pitch between the touch detection electrodes TDL is wide, from the viewpoint of the ESD protection, as illustrated in FIG. 11, there is a possibility that the static electricity SE becomes difficult to be released due to long path for releasing the static electricity SE to the touch detection electrodes TDL through the conductive layer 52. In addition, from the viewpoint of the touch detection function, the position resolution of touch detection is lowered. Therefore, the pitch between the touch detection electrodes TDL is desirably equal to or smaller than 10 mm.

In the above-described embodiment, although the conductive layer 52 is provided in the polarizing plate 35, this is not limitative. Alternatively, the conductive layer is configured separately from the polarizing plate.

In the above-described embodiment, although the dummy electrodes 37 are provided between the touch detection electrodes TDL, this is not limitative. Alternatively, the dummy electrodes may not be provided.

3. Application Examples

Next, application examples of the display devices with a touch detection function described in the embodiment and the modifications will be described with reference to FIG. 16 to FIG. 20G. The display device with a touch detection function of the above-described embodiment and the like is applicable to electronic units in any fields, such as a television device, a digital camera, a notebook personal computer, a portable terminal device such as a mobile phone, and a video camera. In other words, the display device with a touch detection function of the above-described embodiment and the like is applicable to electronic units in various fields for displaying a picture signal input from outside or a picture signal internally generated as an image or a picture.

Application Example 1

Figure 16:
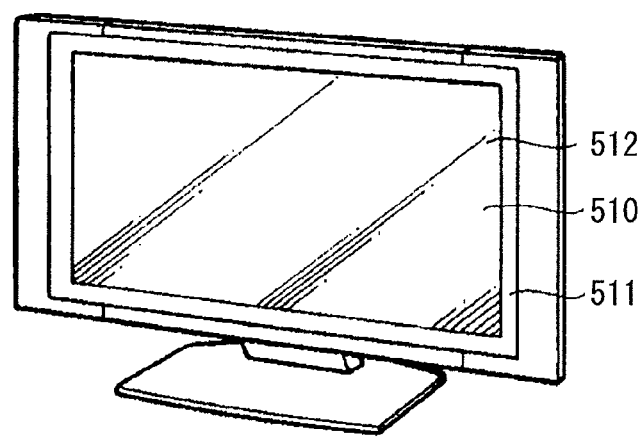
FIG. 16 is a perspective view illustrating an appearance configuration of an application example 1, out of display devices with a touch detection function applied with the embodiment.

FIG. 16 illustrates an appearance of a television device to which the display device with a touch detection function of the above-described embodiment and the like is applied. The television device has, for example, a picture display screen section 510 including a front panel 511 and a filter glass 512. The picture display screen section 510 is configured of the display device with a touch detection function according to the above-described embodiment and the like.

Application Example 2

Figure 17A:
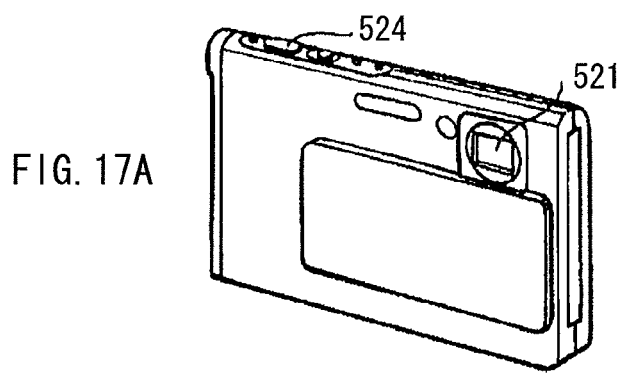
FIGS. 17A and 17B are perspective views illustrating an appearance configuration of an application example 2.
Figure 17B:
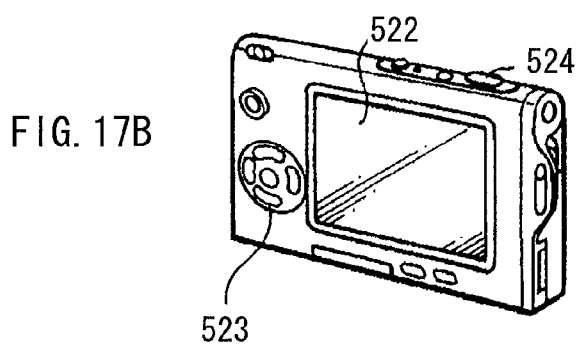

FIGS. 17A and 17B illustrate an appearance of a digital camera to which the display device with a touch detection function of the above-described embodiment and the like is applied. The digital camera has, for example, a light emitting section for a flash 521, a display section 522, a menu switch 523, and a shutter button 524. The display section 522 is configured of the display device with a touch detection function according to the above-described embodiment and the like.

Application Example 3

Figure 18:
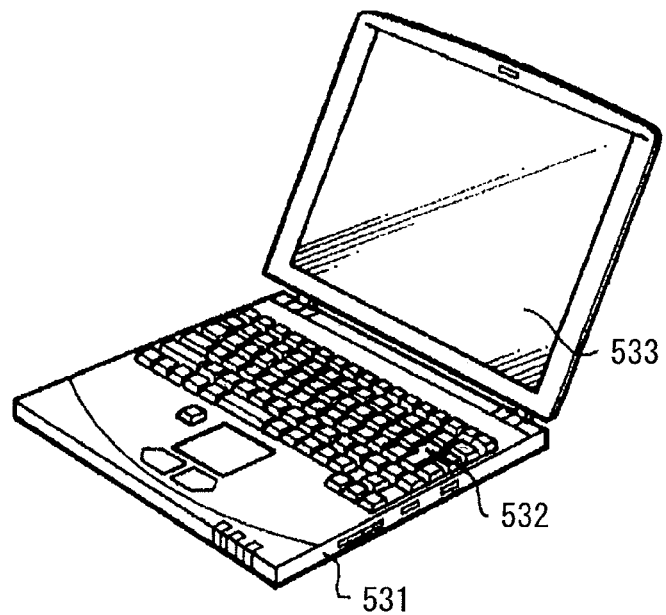
FIG. 18 is a perspective view illustrating an appearance configuration of an application example 3.

FIG. 18 illustrates an appearance of a notebook personal computer to which the display device with a touch detection function of the above-described embodiment and the like is applied. The notebook personal computer has, for example, a main body 531, a keyboard 532 for operation of inputting characters and the like, and a display section 533 for displaying an image. The display section 533 is configured of the display device with a touch detection function according to the above-described embodiment and the like.

Application Example 4

Figure 19:
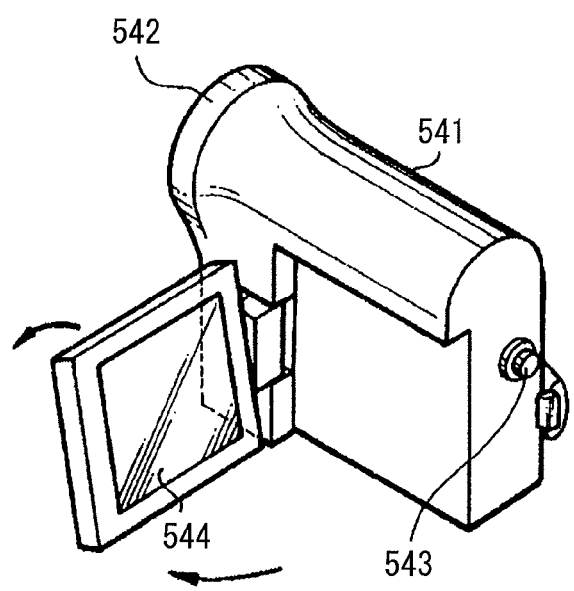
FIG. 19 is a perspective view illustrating an appearance configuration of an application example 4.
Figure 20:
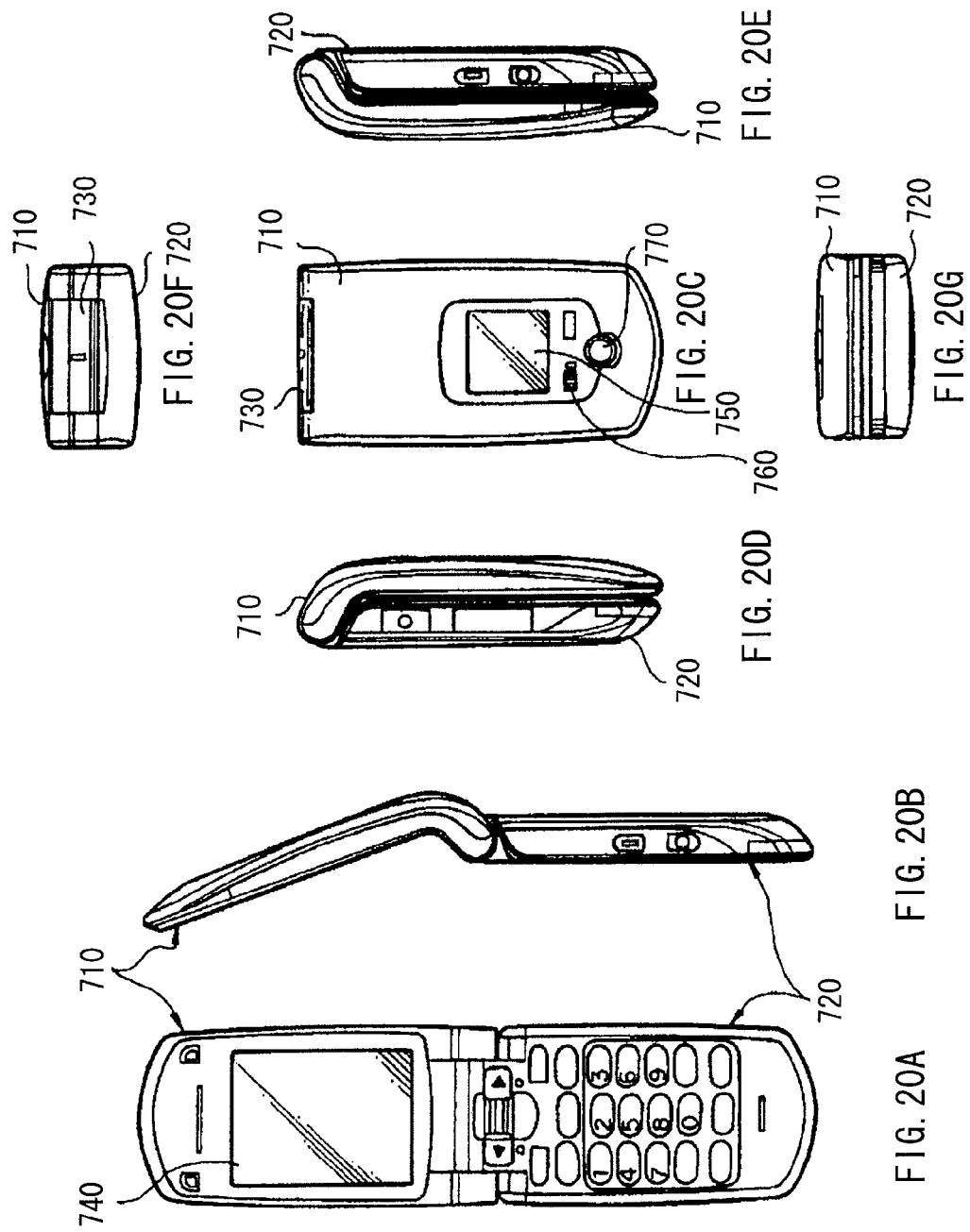
FIGS. 20A to 20G are front views, side views, a top view, and a bottom view illustrating an appearance configuration of an application example 5.

FIG. 19 illustrates an appearance of a video camera to which the display device with a touch detection function of the above-described embodiment and the like is applied. The video camera has, for example, a main body 541, a lens 542 for shooting an object provided on the front side face of the main body 541, a shooting start/stop switch 543, and a display section 544. Also, the display section 544 is configured of the display device with a touch detection function according to the above-described embodiment and the like.

Application Example 5

FIGS. 20A to 20G illustrate an appearance of a mobile phone to which the display device with a touch detection function of the above-described embodiment and the like is applied. In the mobile phone, for example, a top-side enclosure 710 and a bottom-side enclosure 720 are joined by a joint section (a hinge section) 730. The mobile phone has a display 740, a sub-display 750, a picture light 760, and a camera 770. The display 740 or the sub-display 750 is configured of the display device with a touch detection function according to the above-described embodiment and the like.

Hereinbefore, although the disclosure has been described with referring to the embodiment, the modifications, and the application examples to the electronic units, the disclosure is not limited thereto, and various modifications may be made.

For example, in the above-described embodiment and the like, the display device with a touch detection function is of a so-called in-cell type in which a liquid crystal display section and a touch detection section are integrated. However, this is not limitative, and alternatively, the display device with a touch detection function may be of a so-called on-cell type in which a touch detection section is provided on a surface of a liquid crystal display section, or may be provided with a touch detection section externally on a surface of a liquid crystal display section.

Figure 21:
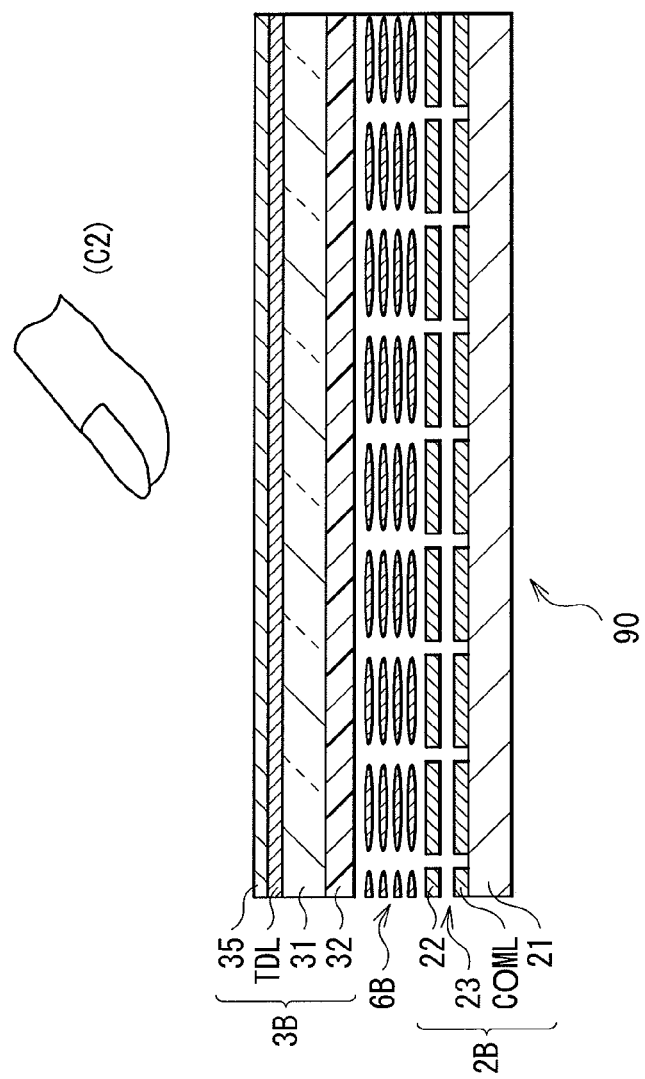
FIG. 21 is a sectional view illustrating a schematic cross-sectional configuration of a display section with a touch detection function according to a modification of the embodiment.

For example, in the above-described embodiment and the like, the display section with a touch detection function 10 is configured by integrating the touch detection section 30 and the liquid crystal display section 20 using a liquid crystal of various modes such as TN, VA, and ECB. Alternatively, the touch detection section may be integrated with a liquid crystal display section using a liquid crystal of lateral-electric-field mode such as FFS (fringe field switching) and IPS (in-plane switching). For example, in a case where a liquid crystal in the lateral-electric-field mode is used, a display section with a touch detection function 90 may be configured as illustrated in FIG. 21. FIG. 21 illustrates an example of a cross-sectional configuration of a relevant part in the display section with a touch detection function 90, and illustrates a state where a liquid crystal layer 6B is sandwiched between a pixel substrate 2B and a facing substrate 3B. Since names, functions, and the like of other parts are the same as in the case of FIG. 5, the description thereof is omitted. In the example, unlike the case of FIG. 5, the drive electrodes COML commonly used for display and for touch detection are provided directly on the TFT substrate 21, and configure a part of the pixel substrate 2B. The pixel electrodes 22 are arranged above the drive electrodes COML through an insulating layer 23. Note that the configuration is not limited to this example, and alternatively, for example, the pixel electrodes 22 may be provided on the TFT substrate 21, and the common electrodes COML may be provided on the pixel electrodes 22 through the insulating layer 23. In these cases, all dielectric bodies including the liquid crystal layer 6B, which are arranged between the drive electrodes COML and the touch detection electrodes TDL, contribute to the formation of the capacitance element C1.

The present application contains subject matter related to that disclosed in Japanese Priority Patent Application JP 2010-205573 filed in the Japan Patent Office on Sep. 14, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. A display device comprising:
a pixel substrate;
a plurality of pixel electrodes on an upper surface of the pixel substrate;
an opposed insulating layer having a lower surface facing the pixel substrate and an upper surface facing away from the pixel substrate;
an outermost layer that constitutes a touch detection surface;
a plurality of display elements between the pixel substrate and the opposed insulating layer;
a common electrode that is disposed between the opposed insulating layer and the display elements and that overlaps the plurality of display elements;
a plurality of detection electrodes for touch detection on the opposed insulating layer, an electrostatic capacitance being formed at the detection electrodes;
a conductive layer that is insulated from or is connected with high resistance to the detection electrodes; and
a polarizing layer,
wherein,
the polarizing layer is disposed between the conductive layer and the outermost layer,
the detection electrodes are disposed between an upper surface side of the opposed insulating layer and the conductive layer,
the conductive layer is disposed between the detection electrodes and the polarizing layer,
the conductive layer has (a) sheet resistance value that is sufficiently low to allow the conductive layer to provide an effective electrostatic discharge path and (b) an RC time constant larger than a predetermined minimum time constant defined by sampling timings in a touch detection period, and
in a vertical direction a distance from the touch detection surface to the detection electrodes is larger than a distance from the touch detection surface to the conductive layer.

2. The display device according to claim 1, wherein the predetermined resistance value is $10^{12}$ Ω/sq.

3. The display device according to claim 2, wherein:
the touch detection circuit detects the external proximity object based on a difference between a sampling result at a start timing of a detection period and a sampling result at an end timing of the detection period, the detection period being set to include a transition timing of the detection signal therewithin; and
a time length of the detection period is employed as the minimum time constant.

4. The display device according to claim 3, wherein the time constant of the conductive film has a value equal to or more than 10 times the minimum time constant.

5. The display device according to claim 3, wherein the time constant of the conductive film has a value equal to or more than 100 times the minimum time constant.

6. The display device according to claim 1, further comprising a polarizing plate, wherein the conductive film is formed integrally with the polarizing plate.

7. The display device according to claim 1, wherein the conductive film is disposed to overlie at least an effective display region in which the display elements are allowed to perform the display operation.

8. The display device according to claim 1, wherein:
the conductive film is arranged on an opposite side of a detection electrode layer from the common electrode, the detection electrode layer including the touch detection electrodes; and
a distance between common electrode and the detection electrode layer is larger than a distance between the conductive film and the detection electrode layer.

9. The display device according to claim 7, further comprising dummy electrodes which are arranged between the plurality of touch detection electrodes and are maintained in an electrically floating state.

10. The display device according to claim 1, wherein a space size between the touch detection electrode and the dummy electrode adjacent to each other is equal to or smaller than 50 μm.

11. The display device according to claim 1, wherein a total arrangement area of the touch detection electrodes and the dummy electrodes, within the effective display region, is 50% of the area of the effective display region or more.

12. The display device according to claim 1, wherein the conductive film is connected to a constant voltage source.

13. The display device according to claim 1, wherein the touch detection electrodes are arranged side by side with a pitch of 10 mm or less.

14. The display device according to claim 1, wherein the display elements include pixel electrodes, the pixel electrodes facing the common electrode.

15. The display device according to claim 1, wherein the display elements include the pixel electrodes being between the opposed insulating layer and the common electrode, or being arranged between the pixel substrate and the common electrode.

16. A display device comprising:
a first substrate;
a plurality of pixel electrodes on an upper surface of the first substrate;
a second substrate having a lower surface facing the first substrate and an upper surface facing away from the pixel substrate;
an outermost layer that constitutes a touch detection surface;
a plurality of display elements between the first substrate and the second substrate;
a common electrode disposed between the second substrate and the first substrate;
a plurality of detection electrodes for touch detection on the second substrate, an electrostatic capacitance being formed at the detection electrodes;
a conductive layer that is insulated from or is connected with high resistance to the detection electrodes; and
a polarizing layer,
wherein:
the polarizing layer is disposed between the conductive layer and the outermost layer,
the detection electrodes are disposed between an upper surface side of the second substrate and the conductive layer,
the conductive layer is disposed between the detection electrodes and the polarizing layer,
the conductive layer has (a) a sheet resistance value that is sufficiently low to allow the conductive layer to provide an effective electrostatic discharge path and (b) an RC time constant larger than a predetermined minimum time constant defined by sampling timings in a touch detection period, and
in a vertical direction crossing the second substrate, a distance from the touch detection surface to the detection electrodes is larger than a distance from the touch detection surface to the conductive layer.

17. The display device according to claim 16, further comprising dummy electrodes which are arranged between the plurality of detection electrodes.

18. The display device according to claim 17, wherein the dummy electrodes are maintained in an electrically floating state.

19. The display device according to claim 16, wherein a space size between a detection electrode and a dummy electrode adjacent to each other is equal to or smaller than 50 μm.

20. The display device according to claim 16, wherein a total arrangement area of the detection electrodes and the dummy electrodes, within an effective display region, is 50% of the area of the effective display region or more.

* * * * *